United States Patent
Nygren et al.

(10) Patent No.: US 10,390,323 B2
(45) Date of Patent: Aug. 20, 2019

(54) SYSTEM AND METHOD FOR SELECTIVELY DE-ACTIVATING A TRANSMITTER MODE OF A CARGO MONITORING DEVICE

(71) Applicant: LOCUS SOLUTIONS, LLC, Jupiter, FL (US)

(72) Inventors: Blair Nygren, Jupiter, FL (US); Rodney Parsons, Jupiter, FL (US); Chris Lafferty, Jupiter, FL (US); Casimir E. Lawler, Jr., Boise, ID (US)

(73) Assignee: LOCUS SOLUTIONS, LLC, Jupiter, FL (US)

( * ) Notice: Subject to any disclaimer, the term of this patent is extended or adjusted under 35 U.S.C. 154(b) by 0 days.

(21) Appl. No.: 16/113,466

(22) Filed: Aug. 27, 2018

(65) Prior Publication Data

US 2019/0069261 A1 Feb. 28, 2019

Related U.S. Application Data

(60) Provisional application No. 62/550,917, filed on Aug. 28, 2017.

(51) Int. Cl.
*H04M 3/00* (2006.01)
*H04W 60/04* (2009.01)
*H04W 64/00* (2009.01)
*H04W 8/24* (2009.01)
*H04W 4/44* (2018.01)
(Continued)

(52) U.S. Cl.
CPC ............. *H04W 60/04* (2013.01); *H04W 8/24* (2013.01); *H04W 64/00* (2013.01); *H04W 4/029* (2018.02); *H04W 4/44* (2018.02); *H04W 60/06* (2013.01)

(58) Field of Classification Search
CPC ......... H04W 52/0261; H04W 52/0274; H04W 52/0277
See application file for complete search history.

(56) References Cited

U.S. PATENT DOCUMENTS 8,861,415 B2 * 10/2014 Sturm ............... H04W 52/0235
370/311
2007/0085822 A1 * 4/2007 Lagnado ............... G06F 1/1616
345/156
2008/0231454 A1 9/2008 Curcio
(Continued)

FOREIGN PATENT DOCUMENTS

EP 2355018 A1 * 8/2011 ........... G06Q 10/109

OTHER PUBLICATIONS

International Search Report regarding International Application No. PCT/US2018/048373, dated Dec. 18, 2018.
(Continued)

*Primary Examiner* — Shantell L Heiber
(74) *Attorney, Agent, or Firm* — Harness, Dickey & Pierce, P.L.C.

(57) ABSTRACT

A mobile monitoring device includes a communication module including transmitter functionality to transmit data and receiver functionality to receive data and a data extraction module that is configured to extract a cell tower identification from the received data. The mobile monitoring device also includes a communication state determination module that is configured to de-activate the transmitter functionality when the cell tower identification matches an airport identification.

16 Claims, 5 Drawing Sheets

(51) Int. Cl.
*H04W 60/06* (2009.01)
*H04W 4/029* (2018.01)

(56) References Cited

U.S. PATENT DOCUMENTS

| | | | |
|---|---|---|---|
| 2010/0167714 A1* | 7/2010 | Howarter | H04M 1/72577 |
| | | | 455/418 |
| 2012/0214466 A1* | 8/2012 | Tadayon | H04W 4/50 |
| | | | 455/418 |
| 2013/0147617 A1 | 6/2013 | Boling et al. | |
| 2013/0214909 A1 | 8/2013 | Meijers | |
| 2015/0339902 A1 | 11/2015 | Latorre | |
| 2016/0192141 A1* | 6/2016 | Park | H04W 4/023 |
| | | | 455/456.3 |
| 2016/0260059 A1 | 9/2016 | Benjamin et al. | |
| 2017/0320569 A1* | 11/2017 | Gordon | B64C 39/024 |
| 2018/0007630 A1* | 1/2018 | Nacer | H04W 52/0235 |

OTHER PUBLICATIONS

Written Opinion regarding International Application No. PCT/US2018/048373, dated Dec. 18, 2018.

* cited by examiner

SYSTEM AND METHOD FOR SELECTIVELY DE-ACTIVATING A TRANSMITTER MODE OF A CARGO MONITORING DEVICE

CROSS-REFERENCE TO RELATED APPLICATIONS

This application claims the benefit of U.S. Provisional Application No. 62/550,917, filed on Aug. 28, 2017. The entire disclosure of the above application is incorporated herein by reference.

FIELD

The present disclosure relates to systems and methods for selectively de-activating a transmitter mode of a cargo monitoring device.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to mobile monitoring devices that monitor cargo within a transport vehicle, and more particularly to selectively de-activating and activating transmitter functionality based upon a cellular tower identification.

Monitoring systems can be used to monitor transportation of goods from one location to another. For example, a monitoring system may be used to track the movement of a truck, car, ship, or other transportation vehicle as the vehicle travels to a destination to deliver goods. The monitoring system may also monitor environmental characteristics of a transport environment.

SUMMARY

In an example, a device is disclosed. The device includes a communication module including transmitter functionality to transmit data and receiver functionality to receive data and a data extraction module that is configured to extract a cell tower identification from the received data. The device also includes a communication state determination module that is configured to de-activate the transmitter functionality when the cell tower identification matches an airport identification.

In other features, the device also includes a database for retaining the airport identification, and the communication state determination module accesses the database upon receiving the cell tower identification and compares the cell tower identification to the airport identification.

In other features, the communication state determination module is further configured to activate the transmitter functionality upon detection of an activation sequence. In other features, the communication state determination module is further configured to detect a plurality of communication signals within a predetermined time period that represents the activation sequence, and respective ones of the plurality communication signals including a different identification with respect to the other communication signals and the identification is not the airport identification.

In other features, the device also includes a time module that is configured to initiate a countdown upon de-activation of the transmitter functionality, and the countdown represents an estimated travel time.

In other features, the device includes a sensor that is configured to measure at least one environmental characteristic associated with stored goods.

In other features, the device includes an environmental monitoring module that is configured to compare the at least one measured environmental characteristic with a predetermined environmental threshold and generate an alert when the at least one measured environmental characteristic exceeds the predetermined environmental threshold.

In other features, the communication module is configured to transmit the alert to a remote server.

In other features, the alert is stored in a database.

In an example, a method is disclosed. The method includes receiving data including cell tower data at a communication module, extracting a cell tower identification from the received data, and de-activating the transmitter functionality of the communication module when the cell tower identification matches an airport identification.

In other features, the method also includes retaining the airport identification within a database, accessing the database upon receiving the cell tower identification, and comparing the cell tower identification to the airport identification.

In other features, the method also includes activating the transmitter functionality upon detection of an activation sequence. In other features, method also includes detecting a plurality of communication signals within a predetermined time period representing the activation sequence, and respective ones of the plurality communication signals including a different identification with respect to the other communication signals and the identification is not the airport identification.

In other features, the method also includes initiating a countdown upon de-activation of the transmitter functionality, and the countdown represents an estimated travel time.

In other features, the method includes receiving at least one measured environmental characteristic associated with stored goods from a sensor.

In other features, the method includes comparing the at least one measured environmental characteristic with a predetermined environmental threshold and generating an alert when the at least one measured environmental characteristic exceeds the predetermined environmental threshold.

In other features, the method includes transmitting the alert to a remote server.

In other features, the method includes storing the alert in a database.

In other features, the method includes receiving the data directly from one or more cell towers.

In other features, the method includes receiving the data from a communication module of a mobile monitoring device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The present disclosure is related to mobile monitoring devices used within a transport vehicle. Features of various embodiments of the present disclosure include, but are not limited to: (1) monitoring location, temperature, and/or other characteristics of cargo using a device that may be designed to be disposed of at the end of one or more trips; (2) generating alerts based on a variety of temperature conditions, such as multiple temperature thresholds; (3) providing multiple levels of alerts and escalating alerts to different users (e.g., on-call individual, supervisor, etc.); (4) providing an indication of an end of trip, beginning of trip, and/or one or more checkpoints based on location data and data from one or more sensors; and/or (5) selectively de-activating transmitter functionality to reduce power consumption during air travel.

Figure 1:
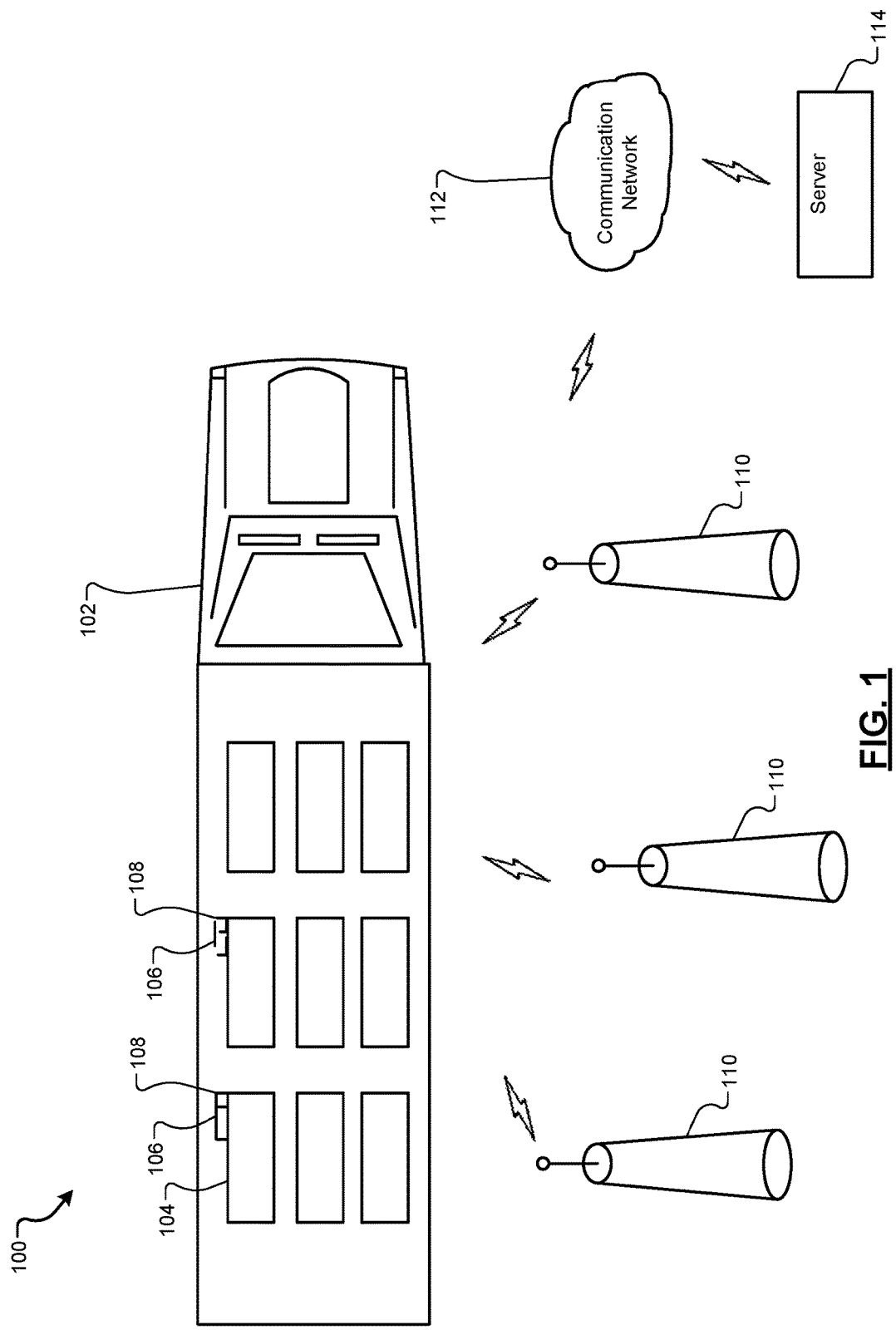
FIG. 1 is a block diagram of an example transport vehicle including a mobile monitoring device according to the principles of the present disclosure.

Referring now to FIG. 1, an environment 100 includes a transport vehicle 102. While illustrated as a semi-tractor trailer vehicle, it is understood that the transport vehicle 102 may include any type of transport vehicle capable of transporting goods within a desired environment. The transport vehicle 102 is configured to transport goods 104. A mobile monitoring device 106 is shown in the transport vehicle 102 for monitoring the goods 104 via one or more sensors 108. The environment 100 also includes cellular towers 110 (i.e., cell towers), a communication network 112, and a remote server 114. The mobile monitoring device 106 is in communication with a remote server 114 via the communication network 112 and the cell towers 110. The remote server 114 uses signals transmitted by the mobile monitoring device 106 and relayed by cell towers 110 to, for example, determine the location of the transport vehicle 102. In some embodiments, as shown in FIG. 1, the mobile monitoring device 106 is coupled to goods 104 (i.e., fastened to a box housing the transported goods, to a pallet on which the goods are placed, affixed to the goods themselves, etc.). In some embodiments, the mobile monitoring device 106 operates within an enclosed space of the transport vehicle 102, such as a cargo area. In other embodiments, the mobile monitoring device 106 is coupled to the transport vehicle 102 in other suitable locations. It should be understood that the positioning of the mobile monitoring device 106 in the transport vehicle 102 may vary without departing from the scope of the present disclosure.

The mobile monitoring device 106 includes one or more sensors 108 coupled to and/or housed within the mobile monitoring device 106. The sensors 108 may include an accelerometer, temperature sensor, ambient light sensor, or any other sensor configured to sense the condition or environment surrounding goods 104. The sensors 108 are used to, for example, measure a temperature of cargo or near the cargo, to sense changes in the intensity of light in the cargo area (to determine if a cargo door is open), and to sense acceleration forces (to determine if vehicle 102 is in motion). In the embodiment of FIG. 1, the sensors 108 are shown housed within mobile monitoring device 106. However, in other embodiments, the sensors 108 may be located in any other position within transport vehicle 102, and may or may not be integrated with mobile monitoring device 106 (i.e., sensors 108 may communicate wirelessly with the mobile monitoring device 106 via a wireless connection).

The mobile monitoring device 106 communicates with the remote server 114 via the communication network 112 and the cell towers 110. The communication network 112 may be or include any type of network (i.e., a cellular network or other a radio communication network, a WAN, a LAN, etc.) that transmits information between the mobile monitoring device 106 and the remote server 114 via one or more of a variety of communications protocols. The cell towers 110 transmit cellular signals to the mobile monitoring device 106, which can be used to estimate the location of mobile monitoring device 106. In some embodiments, cellular triangulation is used to estimate the location of the mobile monitoring device 106. While cell towers 110 are shown in FIG. 1, it should be understood that, in some embodiments, other types of equipment (i.e., GPS satellites, other satellites) may be used, alone or in combination with the cellular signals, to estimate the location of the mobile monitoring device 106 in the illustrated system.

In various embodiments, owners, operators, and the like, can interface with the remote server 114 to analyze the environmental characteristics pertaining to the goods 104 as monitored by the mobile monitoring device 106. For example, the remote server 114 may be configured in a cloud-based configuration, and the owners/operators can communicate with the remote server 114 via mobile electronic devices to analyze the measured environmental characteristics. Additionally, the remote server 114 can transmit alerts to the mobile electronic devices when one or more environmental characteristics exceed a predetermined environmental threshold.

Figure 2:
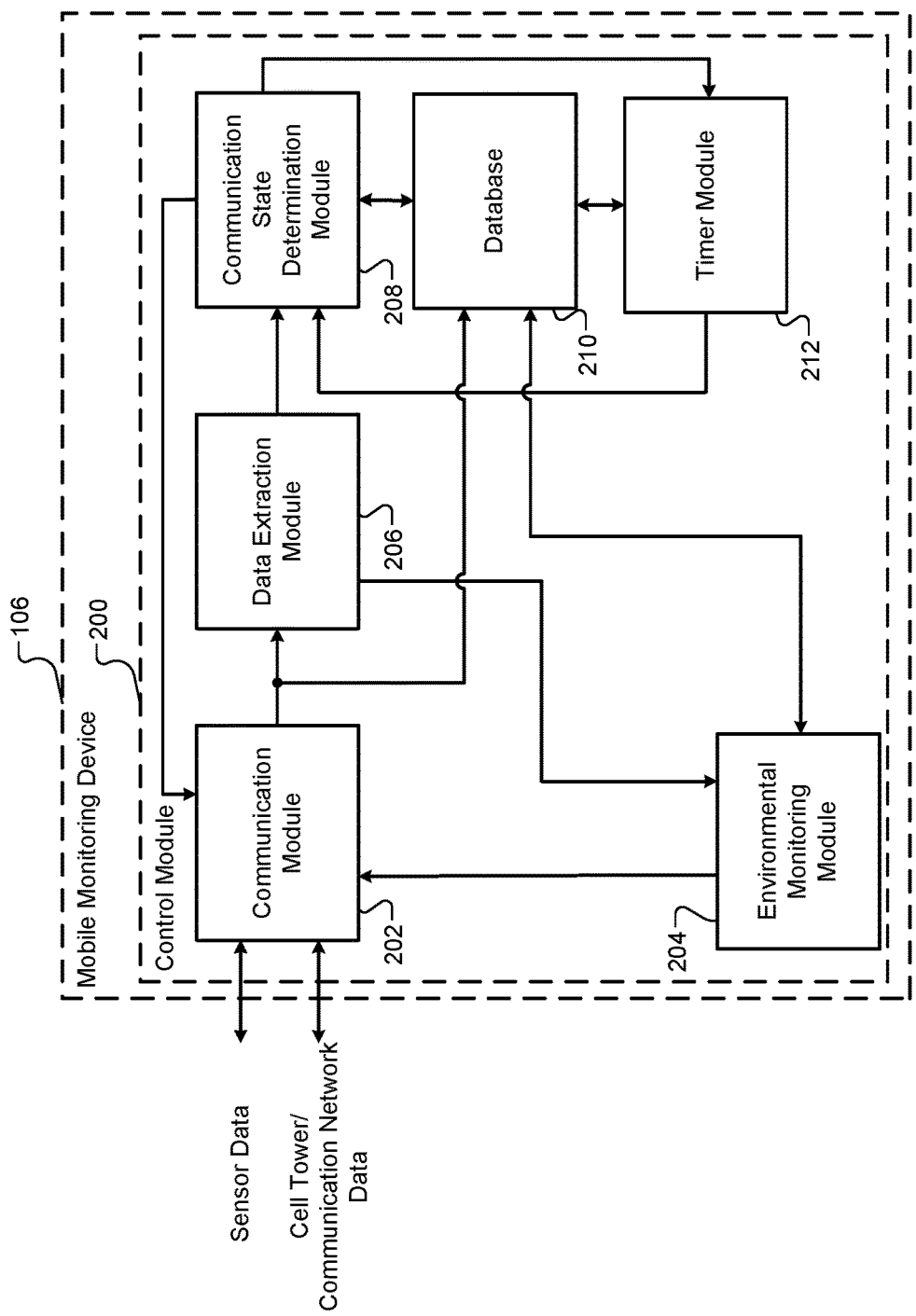
FIG. 2 is a block diagram of an control module of the mobile monitoring device according to the principles of the present disclosure.

FIG. 2 illustrates an example block diagram of a control module 200 of the mobile monitoring device 106. The control module 200 includes a communication module 202, an environmental monitoring module 204, a data extraction module 206, a communication state determination module 208, a database 210, and a timer module 212.

The communication module 202 provides communication functionality between the mobile monitoring device 106 and other components within the environment 100. The communication module 202 receives communication via the cell towers 110 and/or the communication network 112 and transmits communication signals to the cell towers 110 and/or the communication network 112. The communication module 202 is also in communication with the sensors 108. For example, the sensors 108 can provide sensor signals to the communication module 202 indicative of measured environmental characteristics relating to the goods 104. The communication module 202 receives communication signals from the cell towers 110, and these communication signals include cell tower identification data. As described in greater detail herein, the control module 200 can selectively deactivate communication functionality, such as transmission functionality, based upon the cell tower identification data.

The environmental monitoring module 204 receives, as input, the measured environmental characteristics from the sensors 108. The environmental monitoring module 204 is compares the measured environmental characteristics to corresponding predetermined environmental thresholds. In an embodiment, the environmental monitoring module 204 accesses the database 210, which retains the predetermined environmental thresholds (i.e., temperature, light exposure, acceleration, etc.).

The environmental monitoring module 204 determines whether the measured characteristic exceeds the corresponding predetermined environmental threshold. For example, the environmental monitoring module determines whether the temperature exceeds a predetermined environmental temperature threshold, determines whether the light intensity exceeds a predetermined environmental light intensity threshold, and/or determines whether the acceleration forces exceed a predetermined environmental acceleration threshold. When the environmental monitoring module 204 determines the measured environmental characteristic exceeds the corresponding predetermined environmental threshold, the environmental monitoring module 204 generates an alert signal that is provided to the communication module 202. The communication module 202 transmits the alert signal to the remote server 114 via the communication network 112. The alert may also be logged into the database 210. If the measured characteristics do not exceed the corresponding predetermined environmental thresholds, the environmental monitoring module 204 can cause the communication module 202 to transmit the measured environmental characteristics at scheduled time intervals.

The data extraction module 206 receives, as input, the communication signals from the communication module 202 and extracts data from the communication signals (i.e., a plurality of data packets) corresponding to the cell tower identification. For example, the data extraction module 206 may utilize suitable data extraction techniques for obtaining the data representing the cell tower identification from the communication signals or through any other suitable technique for obtaining the data corresponding to the cell tower identification portion. In an embodiment, the data extraction module 206 identifies the data portion pertaining to the cell tower identification based upon communication protocols utilized within the communication network 112 and/or between the cell towers 110 and the mobile monitoring device 106. The data extraction module 206 extracts the identified data portion and provides the identified data portion to the communication state determination module 208 and the database 210.

The data extraction module 206 can also extract data pertaining to the measured environmental characteristics to the environmental monitoring module 204. For example, the data extraction module 206 extracts data representing the measured environmental characteristics from the data packets provided by the communication module 202. Once extracted, the data representing the environmental characteristics is provided to the environmental monitoring module 204.

The communication state determination module 208 selectively deactivates communication functionality of the communication module 202 based upon the cell tower identification. For example, the communication state determination module 208 deactivates transmission functionality of the communication module 202 when the cell tower identification corresponds to an airport cell tower identification. In another example, the communication state determination module 208 can activate transmission functionality based upon the cell tower identification.

In various embodiments, the communication state determination module 208 accesses the database 210 after receiving the cell tower identification. The database 210 retains airport cell tower identification information, and the communication state determination module 208 can access the database 210 to determine whether the cell tower identification matches the airport cell tower identification. When the communication state determination module 208 determines the cell tower identification matches the airport cell tower identification and the communication module 202 is both transmitting and receiving, the communication state determination module 208 provides a de-activation signal to the communication module 202 to deactivate the transmitter functionality while maintaining the receiver functionality. The communication state determination module 208 can also transmit a timer initiation signal to the timer module 212 to initiate operation of the timer module 212.

The timer module 212 increments a time counter until exceeding a predetermined time period. The predetermined time period can correspond to an estimated time for traveling from an originating location to a destination location. For example, the predetermined time period can be an estimated time from flying from an originating airport to a destination airport. In various embodiments, an operator can update the predetermined time period based upon the expected travel time. In another embodiment, the database 210 retains estimated time periods for a set of originating locations to destination locations. In this embodiment, the timer module 212 accesses the database 210 upon receiving the timer initiation signal.

Once the time counter exceeds the predetermined time period, the timer module 212 provides an elapsed time counter signal to the communication state determination module 208. The communication state determination module 208 transmits an activation signal to the communication module 202 activate the transmitter functionality. By selectively deactivating the transmitter functionality of the communication module 202, the mobile monitoring device 106 conserves power during travel.

In some embodiments, while the transmitter functionality is de-activated, the communication state determination module 208 receives cell tower identification information from the data extraction module 206. In this embodiment, the communication state determination module 208 accesses the database 210 to determine whether the cell tower identification information matches the airport identification. For example, while the transmitter functionality is de-activated, the receiver functionality may still be active.

Thus, the communication module 202 may receive communication signals from one or more cell towers 110 during a flight. For instance, the communication module 202 may receive communication signals from a cell tower 110 associated with an airport upon descend of the aircraft. When the cell tower identification information matches the airport identification, the communication state determination module 208 provides an activation countdown signal to the timer module 212. The timer module 212 initiates a countdown upon receiving the activation countdown signal. The countdown may be a predetermined time period indicative of an expected travel time from the originating location to the destination location.

Once the countdown has elapsed, the timer module 212 provides a countdown elapsed signal to the communication state determination module 208, and the communication state determination module 208 transmits a signal to the communication module 202 to activate the transmitter functionality of the communication module 202.

In some instances, the transmitter functionality may be de-activated inadvertently as the transport vehicle 102 passes an airport. For instance, the communication module 202 can receive a cell tower 110 associated with an airport. Based upon this communication signal, the communication state determination module 208 de-activates the transmitter functionality inadvertently. In this instance, the communication state determination module 208 monitors for an activation sequence to activate the transmitter functionality. For example, the communication state determination module 208 determines, or detects, whether the communication module 202 received a predetermined number of different communication signals that are not associated with an airport during a predetermined time period.

In an embodiment, the transmitter functionality has been de-activated due to detection of cell tower signal generated by a cell tower 110 associated with an airport that the transport vehicle 102 comes into proximity with. Upon de-activation, the communication state determination module 208 determines whether a predetermined number of different cell tower signals (i.e., cell tower signals having different identifications) within a predetermined time period. The communication state determination module 208 provides a signal to the timer module 212 to initiate a time counter once a first cell tower signal has been received after de-activation of the transmitter functionality. If the communication state determination module 208 determines that a predetermined number of additional different cell tower signals, which are not associated with an airport, have been received, the communication state determination module 208 activates the transmitter functionality. For example, the communication state determination module 208 may activate the transmitter functionality upon determining three (3) cell tower signals (each having a different identification that is not associated with an airport) were received within a thirty (30) minute time window.

Figure 3:
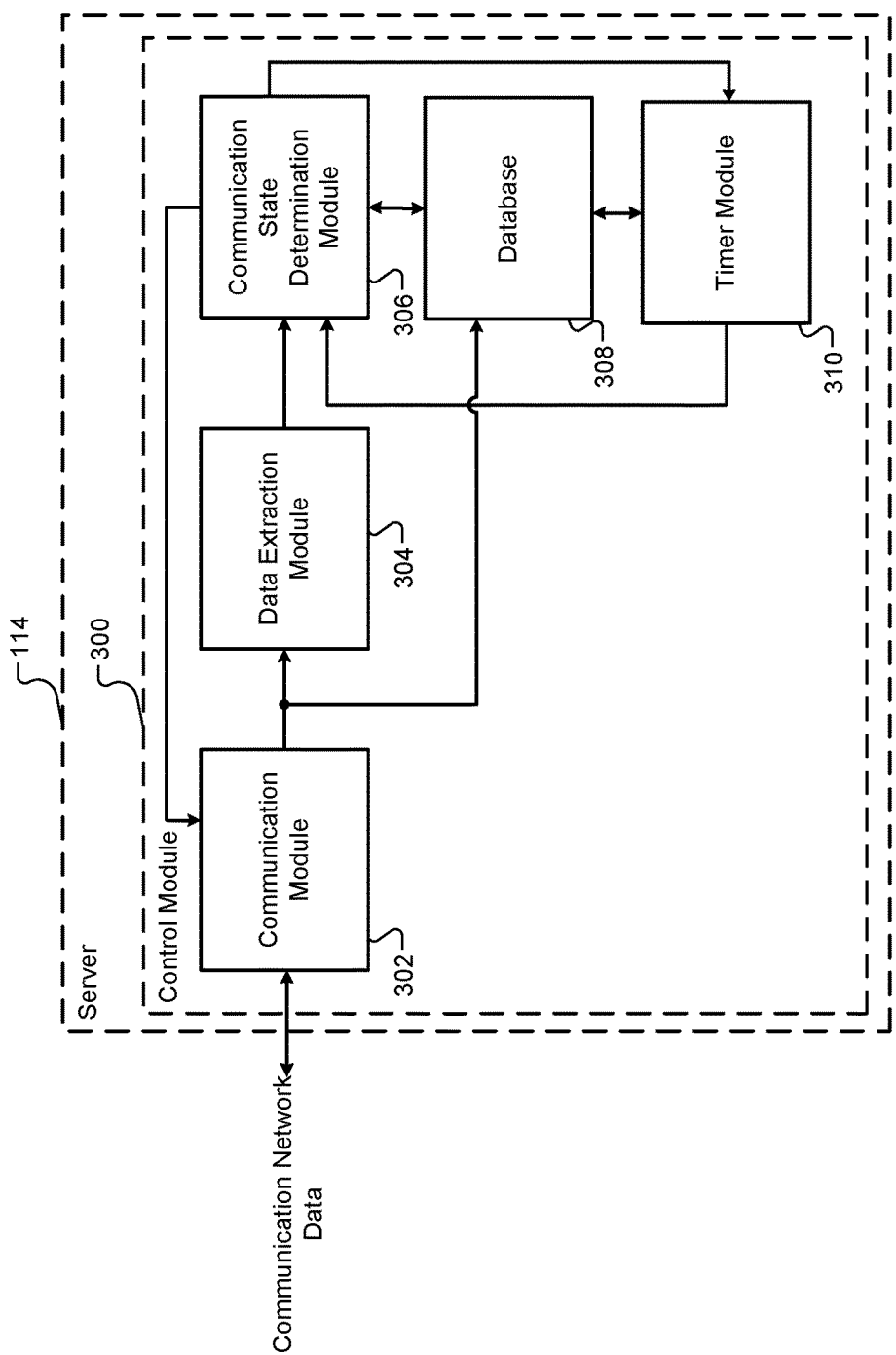
FIG. 3 is a block diagram of an control module of a server according to the principles of the present disclosure.

FIG. 3 illustrates an example block diagram of a control module 300 of the remote server 114. For example, the control module 300 may comprise a cloud-based configuration that selectively activates/deactivates transmission functionality of a mobile monitoring device 106. The control module 300 includes a communication module 302, a data extraction module 304, a communication state determination module 306, a database 308, and a timer module 310.

The communication module 302 provides communication functionality between the remote server 114 and the mobile monitoring device 106 and/or other components within the environment 100. The communication module 302 receives communication via the communication network 112 and transmits communication signals to the communication network 112. For example, the communication module 302 can receive cell tower identification data transmitted from the mobile monitoring device 106. Based upon the cell tower identification data, the control module 300 can transmit signals to selectively deactivate communication functionality of the mobile monitoring device 106.

In an implementation, the communication module 202 sends the cell tower identification data to the communication module 302. The data extraction module 304 receives, as input, the communication signals from the communication module 302 and extracts data from the communication signals corresponding to the cell tower identification.

The data extraction module 304 identifies the data portion pertaining to the cell tower identification based upon communication protocols utilized within the communication network 112 and/or between the cell towers 110 and the mobile monitoring device 106. The data extraction module 304 extracts the identified data portion and provides the identified data portion to the communication state determination module 306 and the database 308.

The communication state determination module 306 selectively deactivates communication functionality of the communication module 202 based upon the cell tower identification. For example, the communication state determination module 306 provides a deactivation signal to the communication module 302, and the communication module 302 sends the deactivation signal to the communication module 202 when the cell tower identification corresponds to an airport cell tower identification. The communication state determination module 306 can also provide an activation signal to the communication module 302 to activate transmission functionality of the communication module 202. The communication module 302 transmits the activation signal to the communication module 202, which then activates the transmission functionality of the communication module 202.

In various embodiments, the communication state determination module 306 accesses the database 308 after receiving the cell tower identification. Similar to the database 210, the database 308 retains airport cell tower identification information, and the communication state determination module 306 can access the database 308 to determine whether the cell tower identification matches the airport cell tower identification. When the communication state determination module 306 determines the cell tower identification matches the airport cell tower identification and the communication module 302 is both transmitting and receiving, the communication state determination module 306 generates a de-activation signal to deactivate the transmitter functionality while maintaining the receiver functionality. The communication state determination module 306 can also transmit a timer initiation signal to the timer module 310 to initiate operation of the timer module 310.

The timer module 310 increments a time counter until exceeding a predetermined time period. The predetermined time period can correspond to an estimated time for traveling from an originating location to a destination location. For example, the predetermined time period can be an estimated time from flying from an originating airport to a destination airport. In various embodiments, an operator can update the predetermined time period based upon the expected travel time. In another embodiment, the database 308 retains estimated time periods for a set of originating locations to destination locations. In this embodiment, the timer module 310 accesses the database 308 upon receiving the timer initiation signal.

Once the time counter exceeds the predetermined time period, the timer module 310 provides an elapsed time counter signal to the communication state determination module 306. The communication state determination module 306 transmits an activation signal to the communication module 302 to activate the transmitter functionality of the communication module 202.

Figure 4:
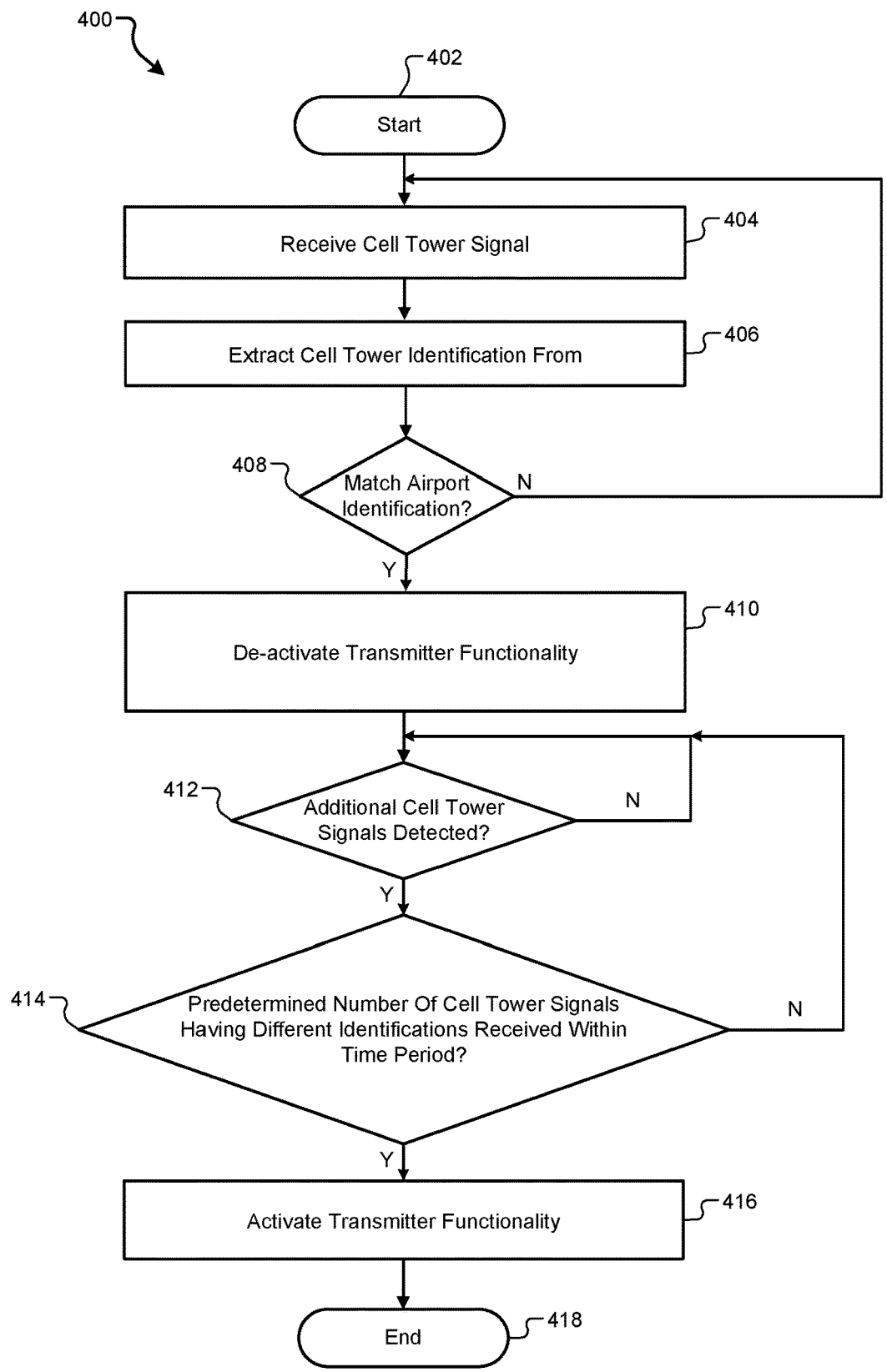
FIG. 4 is a flowchart illustrating an example method for determining a state of operation of a communication module of the mobile monitoring device according to the principles of the present disclosure.

Referring now to FIG. 4, a method 400 of determining a state of operation of a communication module, such as communication module 202, is described. The method is described in the context of the modules included in the example implementation of the control module 200 shown in FIG. 2 in order to further describe the functions performed by those modules. However, the particular modules that perform the steps of the method may be different than the description below and/or the method may be implemented apart from the modules of FIG. 2. For example, the method may be implemented by a single module.

The method 400 begins at 402. At 404, cell tower signals are received at a communication module 202. In embodiments, the cell tower signals are transmitted according to a communication protocol as a plurality of data packets. At 406, the data extraction module 206 extracts a cell tower identification from the cell tower signals. At 408, the communication state determination module 208 determines whether the cell tower identification matches, or corresponds, to an airport identification.

If the cell tower identification matches the airport identification, the communication state determination module 208 causes the transmitter functionality to de-activate at 410. In one example, the transmitter functionality can be de-activated for a predetermined time period (unless interrupted as described herein). For example, the predetermined time period may correspond to an expected travel time, or the like.

At 412, the communication state determination module 208 determines whether additional cell tower signals not associated with an airport have been received. If additional cell tower signals were received, the communication state determination module 208 determines whether a predetermined number of additional cell tower signals having different cell tower identifications were received within a predetermined time period at 414. If no additional cell tower signals were received, the method 400 transitions to 412. If the predetermined number of additional cell tower signals having different cell tower identifications were received within the predetermined time period, the communication state determination module 208 activates the transmitter functionality of the communication module 202 at 416. For example, the communication state determination module 208 generates an interrupt signal based upon the different cell tower identifications being received within the predetermined time period. The method 400 ends at 418.

Figure 5:
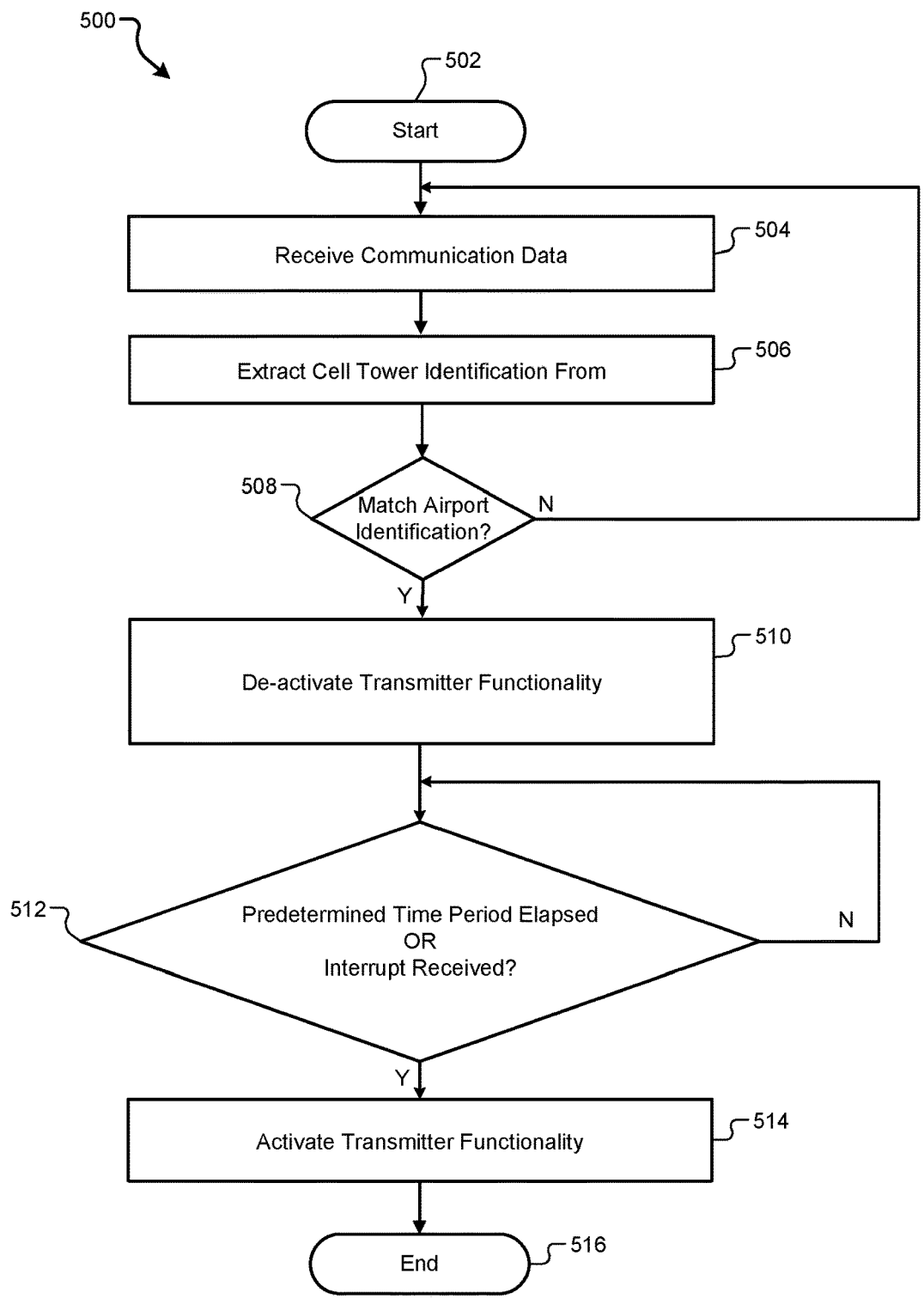
FIG. 5 is a flowchart illustrating an example method for determining a state of operation of a communication module of the mobile monitoring device at the server according to the principles of the present disclosure In the drawings, reference numbers may be reused to identify similar and/or identical elements.

Referring now to FIG. 5, a method 500 of determining a state of operation of a communication module, such as communication module 202, at a remote computing device, such as the remote server 114, is described. The method is described in the context of the modules included in the example implementation of the control module 300 shown in FIG. 3 in order to further describe the functions performed by those modules. However, the particular modules that perform the steps of the method may be different than the description below and/or the method may be implemented apart from the modules of FIG. 3. For example, the method may be implemented by a single module.

The method 500 begins at 502. At 504, communication data including cell tower signal data is received at a communication module 302. At 506, the data extraction module 304 extracts a cell tower identification from the cell tower signals. At 508, the communication state determination module 306 determines whether the cell tower identification matches, or corresponds, to an airport identification.

If the cell tower identification matches the airport identification, the communication state determination module 306 causes the transmitter functionality pf the mobile monitoring device 106 to de-activate at 410. In one example, the transmitter functionality can be de-activated for a predetermined time period (unless interrupted).

At 512, the communication state determination module 306 determines whether the predetermined time period has elapsed or an interrupt has been received. If the predetermined time period has elapsed or the interrupt has been received, the communication state determination module 306 activates the transmitter functionality of the communication module 202 at 514. The interrupt may be received from another computing device at the communication module 302. In one or more implementations, the interrupt may be an operator generated interrupt, or the like. The method 500 ends at 516.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium.

The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A device comprising:
a communication module including transmitter functionality to transmit data and receiver functionality to receive data;
a data extraction module that is configured to extract a cell tower identification from the received data; and
a communication state determination module that is configured to: (1) de-activate the transmitter functionality when the cell tower identification matches an airport identification, (2) detect a plurality of communication signals within a predetermined time period representing an activation sequence, respective ones of the plurality of communication signals including a different identification with respect to the other communication signals and the identification is not the airport identification, and (3) activate the transmitter functionality upon detection of the activation sequence.

2. The device as recited in claim 1, further comprising a database for retaining the airport identification, wherein the communication state determination module accesses the database upon receiving the cell tower identification and compares the cell tower identification to the airport identification.

3. The device as recited in claim 1 further comprising a time module that is configured to initiate a countdown upon de-activation of the transmitter functionality, wherein the countdown represents an estimated travel time.

4. The device as recited in claim 1, further comprising a sensor that is configured to measure at least one environmental characteristic associated with stored goods.

5. The device as recited in claim 4, further comprising an environmental monitoring module that is configured to compare the at least one measured environmental characteristic with a predetermined environmental threshold and generate an alert when the at least one measured environmental characteristic exceeds the predetermined environmental threshold.

6. The device as recited in claim 5, wherein the communication module is configured to transmit the alert to a remote server.

7. The device as recited in claim 5, wherein the alert is stored in a database.

8. A method comprising:
receiving data including cell tower data at a communication module;

extracting a cell tower identification from the received data;
de-activating a transmitter functionality of the communication module when the cell tower identification matches an airport identification;
detecting a plurality of communication signals within a predetermined time period representing an activation sequence, respective ones of the plurality of communication signals including a different identification with respect to the other communication signals and the identification is not the airport identification; and
activating the transmitter functionality upon detection of the activation sequence.

9. The method as recited in claim 8, further comprising: retaining the airport identification within a database; accessing the database upon receiving the cell tower identification; and comparing the cell tower identification to the airport identification.

10. The method as recited in claim 8, further comprising: initiating a countdown upon de-activation of the transmitter functionality, wherein the countdown represents an estimated travel time.

11. The method as recited in claim 8, further comprising receiving at least one measured environmental characteristic associated with stored goods from a sensor.

12. The method as recited in claim 11, further comprising comparing the at least one measured environmental characteristic with a predetermined environmental threshold and generating an alert when the at least one measured environmental characteristic exceeds the predetermined environmental threshold.

13. The method as recited in claim 12, further comprising transmitting the alert to a remote server.

14. The method as recited in claim 12, further comprising storing the alert in a database.

15. The method as recited in claim 8, wherein receiving data further includes receiving the data directly from one or more cell towers.

16. The method as recited in claim 8, wherein receiving data further includes receiving the data from a communication module of a mobile monitoring device.

* * * * *